US008269133B2

(12) United States Patent
Lin

(10) Patent No.: US 8,269,133 B2
(45) Date of Patent: Sep. 18, 2012

(54) ELECTRIC SOLDERING IRON WITH AUTOMATIC POWEROFF AND METHOD THEREOF

(75) Inventor: Jui-Ching Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 516 days.

(21) Appl. No.: 12/610,361

(22) Filed: Nov. 2, 2009

(65) Prior Publication Data

US 2011/0024395 A1   Feb. 3, 2011

(30) Foreign Application Priority Data

Jul. 30, 2009   (CN) .......................... 2009 1 0305014

(51) Int. Cl.
  *B23K 3/04*  (2006.01)
(52) U.S. Cl. .................................... 219/85.16; 219/492
(58) Field of Classification Search ................ 219/85.1, 219/85.16, 490
  See application file for complete search history.

(56) References Cited

U.S. PATENT DOCUMENTS

| 4,534,502 | A | * | 8/1985 | Piurek | 228/102 |
| 6,111,222 | A | * | 8/2000 | Hattori | 219/240 |
| 6,360,935 | B1 | * | 3/2002 | Flake | 228/103 |

* cited by examiner

*Primary Examiner* — Chandra Chaudhari
(74) *Attorney, Agent, or Firm* — Altis Law Group, Inc.

(57) ABSTRACT

An electric soldering iron comprises a power unit connecting the electric soldering iron to an external power source, an electric soldering iron body comprising an iron head and a motion sensor for detecting motion of the electric soldering iron body, and a control system connected to the power unit and the electric soldering iron body, which comprises a switch, a control unit and a timer. The control unit directs the switch to maintain or terminate connection between the power unit and the iron head based on motion detected by the motion sensor and duration measured by the timer. When the duration exceeds a predetermined value, the control system enables the switch to terminate connection of the iron head and the power unit to achieve automatic cutoff of power.

8 Claims, 2 Drawing Sheets

ELECTRIC SOLDERING IRON WITH AUTOMATIC POWEROFF AND METHOD THEREOF

BACKGROUND

1. Technical Field

The present application is related to electric soldering irons and, especially, to an electric soldering iron with automatic power cutoff and a method thereof.

2. Description of Related Art

Electric soldering irons are widely applied in production, testing, and maintaining of electric products. However, powering off of such electric soldering irons after use is often neglected, resulting in damage to the irons and even creating a fire hazard. Furthermore, power is wasted. Therefore, an electric soldering iron with automatic power cutoff and a method thereof is desired.

DETAILED DESCRIPTION

Figure 1:
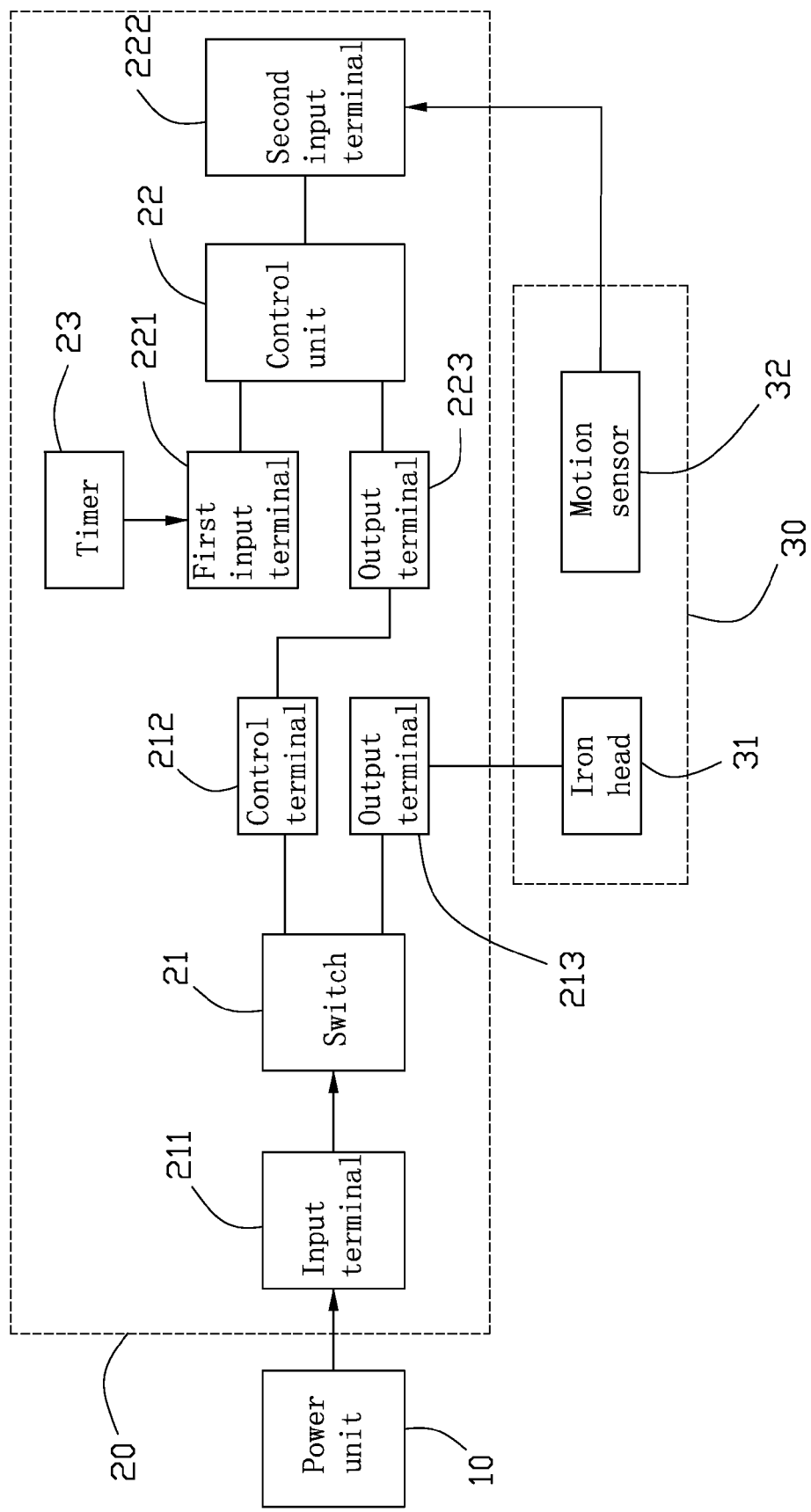
FIG. 1 is a schematic drawing showing an exemplary embodiment of an electric soldering iron of the present application.

Referring to FIG. 1, the electric soldering iron of the present application comprises a power unit 10, a control system 20 and an electric iron body 30. The power unit 10 is configured for connecting the electric soldering iron to an external power source. The control system 20 comprises a switch 21, a control unit 22 and a timer 23. The switch 21 comprises an input terminal 211, an output terminal 213, and a control terminal 212. In the exemplary embodiment of the present application, the switch 21 is implemented as a relay. The control unit 22 comprises a first input terminal 221, a second terminal 222 and an output terminal 223. The timer 23 is connected to the first input terminal 221 of the control unit 22. The input terminal 211 of the switch 21 is connected to the power unit 10, and the control terminal 212 thereof is connected to the output terminal 223 of the control unit 22.

The electric iron body 30 comprises an iron head 31 and a motion sensor 32. The iron head 31 is connected to the output terminal 213 of the switch 21, and the motion sensor 32 is connected to the second input terminal 222 of the control unit 22. The motion sensor 32 is configured for detecting movement of the electric iron body 30.

Figure 2:
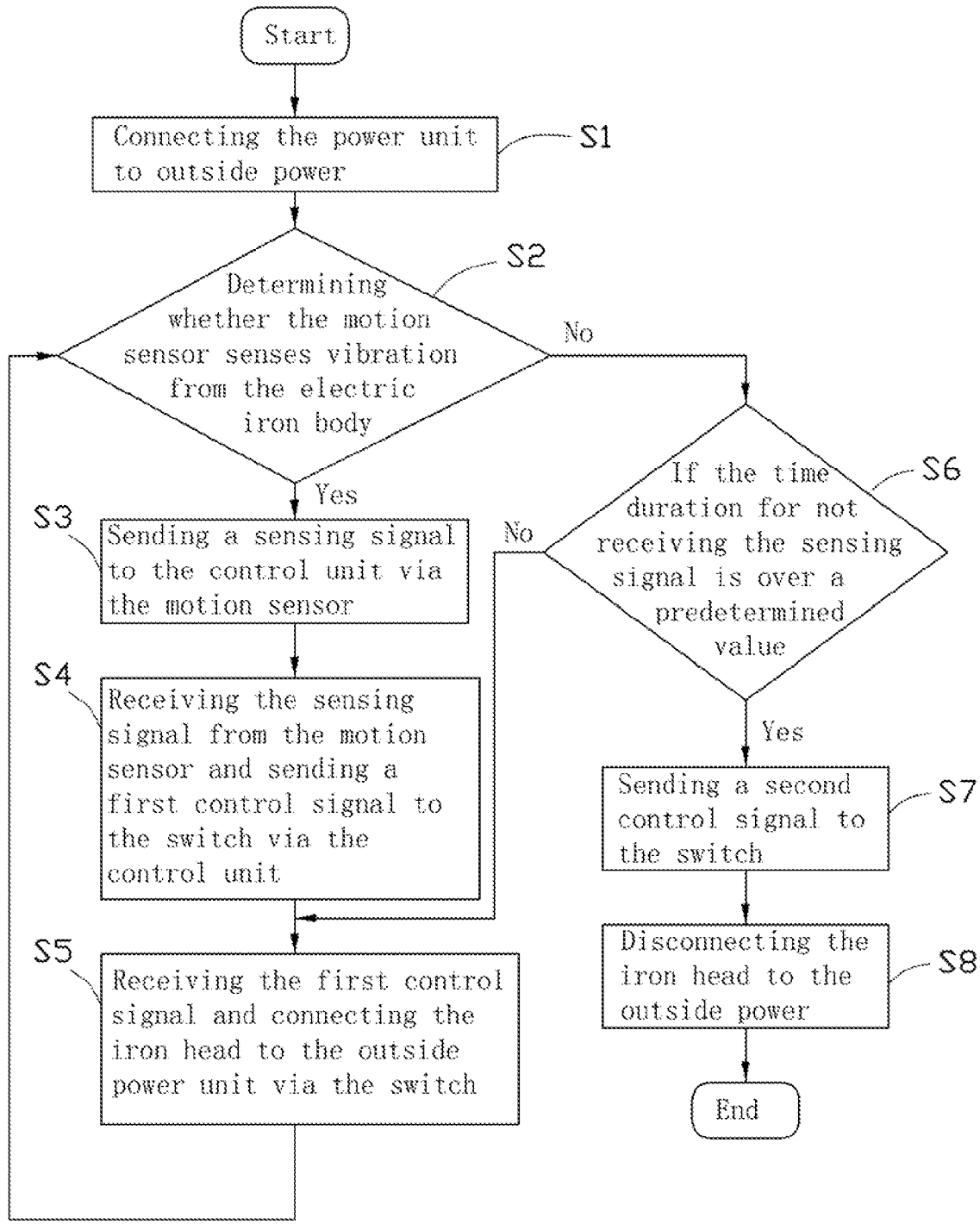
FIG. 2 is a flowchart of a method for automatic power cutoff of an electric soldering iron.

FIG. 2 is a flowchart of a method of automatic power cutoff for an electric soldering iron such as, for example, that of FIG. 1. In step 51, power unit 10 is connected to an external power source. In step S2, the motion sensor 32 determines the presence of movement of the electric iron body 30. If so, indicating that the electric soldering iron is in use, step S3 is implemented. If not, step S6 is implemented.

In step S3, the motion sensor 32 transmits a signal to the control unit 22. In step S4 the control unit 22 receives the signal from the motion sensor 32 and transmits a first control signal to the switch 21. In step S5 the switch 21 receives the first control signal and connects the iron head 31 to the power unit 10, and heating of the iron head 31 begins. Meanwhile, the motion sensor 32 continuously determines whether the electric iron body 30 is in motion, that is, step S2 is repeated.

In step S6, if the time duration since the most recent signal received from the motion sensor 32 exceeds a predetermined value (for example, five minutes), step S7 is implemented, otherwise step S5 is implemented. According to the present application, when the control unit 22 receives no signal, the control unit 22 transmits a first enablement signal to the timer 23 to initiate timing. When the control unit 22 receives a subsequent signal, a disablement signal is transmitted to the timer 23 to stop timing and the timer 23 resets to zero, and step S5 is repeated to maintain the iron head heating. If the duration for no signal received timed by the timer 23 exceeds the predetermined value, the control unit 22 determines that the iron is not in use and step S7 is implemented.

In step S7, the control unit 22 sends a second control signal to the switch 21, and in step S8, after the switch 21 receives a second control signal, it cuts the connection between the iron head 31 and the power unit 10 to terminate heating.

The motion sensor 32 and the control unit 22 determine whether the iron is in use. If the control unit 22 receives no signals from the motion sensor 32, the control unit 22 sends a first enablement signal to the timer 23 to initiate timing. When the timer 23 measures a time in excess of a predetermined value, the control unit 22 directs switch 21 to cut the connection between the iron head 31 and the power 10, providing automatic power cutoff.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electric soldering iron, comprising:
a power unit providing external operating power to the electric soldering iron;
an electric soldering iron body comprising an iron head and a motion sensor configured for detecting motion of the electric soldering iron body; and
a control system connected to the power unit and the electric soldering iron body and comprising a switch, a control unit and a timer, wherein the control unit controls the switch, implementing or terminating connection between the power unit and the iron head, based on motion thereof detected by the motion sensor and time duration measured by the timer.

2. The electric soldering iron as claimed in claim 1, wherein the switch is a relay.

3. The electric soldering iron as claimed in claim 1, wherein the motion sensor sends a signal to the control unit after detecting motion from the electric soldering iron body, the control unit transmits a first control signal to the switch after receiving the signal, and the switch connects the iron head and the power unit after receiving the first control signal.

4. The electric soldering iron as claimed in claim 1, wherein after receiving no signals from the motion sensor, the control unit transmits a first enablement signal to the timer to initiate timing, and after receiving the signals from the motion sensor, the control unit transmits a disablement signal to the timer to stop timing and resets the timer to zero.

5. The electric soldering iron as claimed in claim 1, wherein the control unit determines if a time during which the control unit receives no signals from the motion sensor exceeds a predetermined value, and upon such condition, the control unit transmits a second control signal to the switch for turning off connection between the iron head and the power unit.

6. A method for automatic power cutoff of an electric soldering iron, comprising:
 providing an electric soldering iron comprising an iron head;
 connecting the electric soldering iron to an external power source by way of a switch and a power unit; and
 determining whether the electric soldering iron moves by way of a motion sensor;
 wherein, if the electric soldering iron is determined as being moving, maintaining connection of the iron head to the power unit by way of the switch, and if the electric soldering iron is determined as not being moving, terminating connection of the iron head to the power unit by way of the switch.

7. The method for automatically cutting off power of an electric soldering iron as claimed in claim 6, further comprising:
 determining whether a time duration for no movement of the electric soldering iron exceeds a predetermined value by way of a timer, wherein, if the value is exceeded, terminating connection of the iron head to the power unit, and if the value is not exceeded, maintaining connection of the iron head to the power unit.

8. The method for automatically cutting off power of an electric soldering iron as claimed in claim 6, further comprising:
 sending a signal by way of the motion sensor to a control unit;
 sending a control signal to the switch by way of the control unit; and
 connecting the iron head to the power unit by way of the switch upon receiving the control signal.

* * * * *